H. LYON.
CLUSTER INCANDESCENT LAMP.
APPLICATION FILED MAY 6, 1914.
1,158,249.
Patented Oct. 26, 1915.
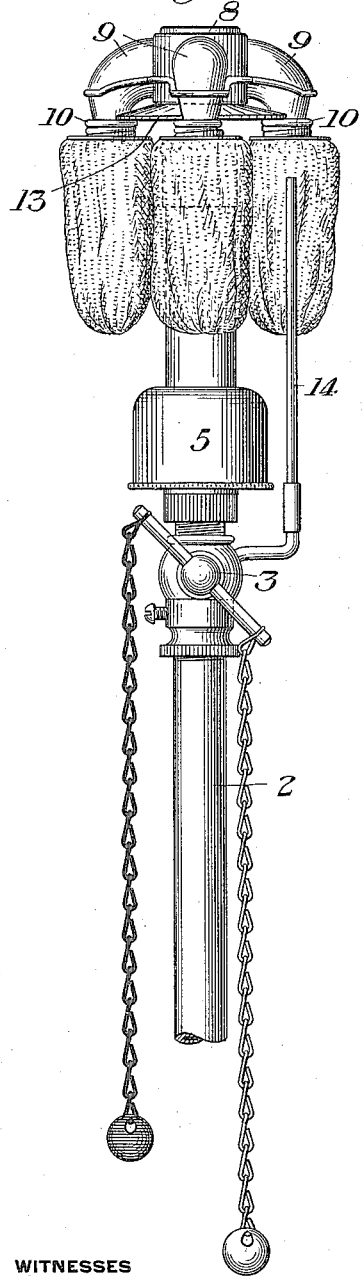
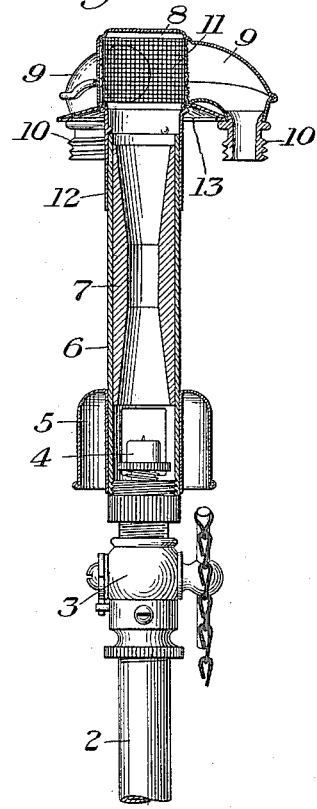
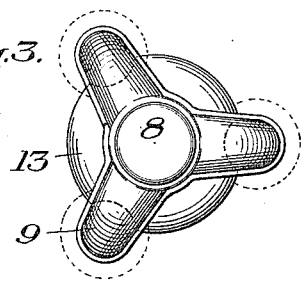
WITNESSES
INVENTOR
Howard Lyon

UNITED STATES PATENT OFFICE.

HOWARD LYON, OF GLOUCESTER CITY, NEW JERSEY, ASSIGNOR TO WELSBACH LIGHT COMPANY, OF GLOUCESTER CITY, NEW JERSEY, A CORPORATION OF NEW JERSEY.

CLUSTER INCANDESCENT LAMP.

1,158,249.   Specification of Letters Patent.   Patented Oct. 26, 1915.

Application filed May 6, 1914. Serial No. 836,665.

*To all whom it may concern:*

Be it known that I, HOWARD LYON, a citizen of the United States, residing at Gloucester City, in the county of Camden and State of New Jersey, have invented a new and useful Improvement in Cluster Incandescent Lamps, of which the following is a full, clear, and exact description, reference being had to the accompanying drawings, forming part of this specification, in which—

Figure 1 is a side elevation showing the preferred form of my lamp; Fig. 2 is a vertical section taken through one of the burner arms; and Fig. 3 is a top plan view.

My invention relates to inverted incandescent lamps, and is designed to provide a cluster lamp of improved efficiency. The lamp is specially designed for use with small limp or rag mantles of less than an inch in diameter, when shaped, as set forth in the application of Sverre Gulbrandsen, Serial No. 836,671, filed May 16, 1914, but may be used generally for inverted incandescent mantles.

The object of my invention is to improve the mixing, prevent flash-backs, provide a cheap burner, and give high efficiency.

In the drawing, which represents a stand or table lamp with three burners, 2 represents the gas supply tube, 3 the control valve, 4 the jet orifice with regulating needle, 5 the hood surrounding the air inlets of the Bunsen tube, and 6 the vertically extending Bunsen tube. Within this Bunsen tube, I provide a lining tube or sleeve 7, which is preferably of the form shown, that is, the bore gradually decreases from the entrance end toward the middle, where there is a straight cylindrical portion. From this cylindrical portion, the bore is tapered gradually outwardly in diverging conical form, as this is found to assist greatly in the proper mixing of the gas and air.

From the mixer tube, the mixture enters a central chamber or manifold 8, whence it flows through the burner arms 9 to the metal burner tips 10. The burner arms 9 curve outwardly and downwardly and also taper from the manifold end toward the burner tip, that is, the bore gradually decreases in size from the chamber end toward the burner tip end. The tapering of these burner arms is important, as this aids greatly in effecting a good mixture and thus preventing flash-backs. The curved form further assists in this action. A burner with arms of right-angled bend is found to flash-back in practice, with this type of burner.

In the cylindrical manifold 8 is placed a cylindrical impedance 11, in the form of wire gauze, which is preferably pushed in through the base portion 12 of the burner and will control the flow of gas to each burner leg. By using this cylindrical gauze in the manifold instead of placing a gauze in each arm, the gauze is large enough to prevent too much impedance and provide proper entrainment of air, while the tapering of the arm brings it down to the proper size for the correct area of burner tip outlet.

In the use of this new burner, it is found that the blue cone of the Bunsen flame is axial of the burner tip, where with former burners of the inverted cluster type, the tip of this blue cone is off center, being nearer the outside than the inside, and affording a starting point for a flash-back near the inner edge of the flame.

The drawings show my improved burner full size in the preferred form which I have used, and I prefer to have the length and proportions of the bore of the liner in the mixer tube, substantially as shown.

The burner preferably may be made in two pieces seamed together, as shown, or otherwise as desired. For instance, the burner may be cast and formed. I prefer the two-part form, however, as this affords a cheap and simple construction, and the inner portions of the burner tips may be expanded in place, thus securing the burner tips to the burner body or arms thereof. I also preferably employ a skirt 13, which surrounds the tube portion 12, this skirt catching the flow of gas from the burners and directing it around to the pilot flame, thus insuring proper ignition at the burners. The pilot tube is shown at 14, and extends in the usual manner as a bypass from the valve so that the pilot light is constantly burning.

The advantages of my invention result from the cheap, simple and effective cluster lamp which is provided, the avoiding of flash-backs, and the high efficiency afforded.

I claim:

1. A vertical cluster burner for inverted incandescent lamps, having a body portion and a plurality of laterally and downwardly extending burner arms, said burner arms each having a gas and air passage extending therethrough, means for securing a mantle to the lower end of each burner arm, and a skirt surrounding the body portion between the burner arms having an annular flange below the burner arms; substantially as described.

2. A cluster burner for inverted incandescent lamps, comprising a manifold having a plurality of arms extending laterally and downwardly, a burner tip connected to the lower end of each arm, each of said arms having a tapering gas and air passage extending therethrough and decreasing in diameter from the manifold to the upper ends of the burner tips, and a downwardly extending mixing chamber connected to the center of the manifold; substantially as described.

3. A cluster burner for inverted incandescent lamps, comprising a manifold having a plurality of arms extending laterally and downwardly, a burner tip connected to the lower end of each arm, each of said arms having a tapering gas and air passage extending therethrough and decreasing in diameter from the manifold to the upper ends of the burner tips, and a downwardly extending mixing chamber connected to the center of the manifold, said mixing chamber gradually decreasing in size and then gradually increasing from the manifold toward the lower end thereof; substantially as described.

4. A cluster burner for inverted incandescent lamps, comprising a central manifold having a plurality of arms extending outwardly and downwardly, each of said arms containing a passage for the mixture of gradually decreasing area toward the burner tip, and a downwardly extending mixing chamber connected to the manifold between the burner arms, substantially as described.

5. A cluster burner for inverted incandescent lamps, comprising a manifold having a plurality of separate outwardly and downwardly extending curved burner arms connected laterally into the sides of the mixing chamber, each of said arms having a tapering passage for the mixture which decreases gradually from the manifold toward the burner tip, substantially as described.

6. A cluster burner for inverted incandescent lamps, comprising a manifold having a plurality of arms extending outwardly and downwardly therefrom, burner tips connected to the lower ends of the arms, a downwardly extending mixing tube connected to the center of the manifold, and a skirt surrounding the mixing tube between the burner tips and so positioned as to receive mixture and produce an annular flame to light the mixture from the various tips, substantially as described.

7. A cluster burner for inverted incandescent lamps, comprising a manifold having a plurality of arms extending outwardly and downwardly therefrom, burner tips connected to the lower ends of the arms, a downwardly extending mixing tube connected to the center of the manifold, a skirt surrounding the mixing tube between the burner tips and so positioned as to receive mixture and produce an annular flame to light the mixture from the various tips, and a pilot tube arranged to light the annular mixture under the skirt around the mixing tube, substantially as described.

In testimony whereof, I have hereunto set my hand.

HOWARD LYON.

Witnesses:
J. H. JOHNSON,
L. F. BOMHOFF.

Copies of this patent may be obtained for five cents each, by addressing the "Commissioner of Patents, Washington, D. C."